Figure 1:
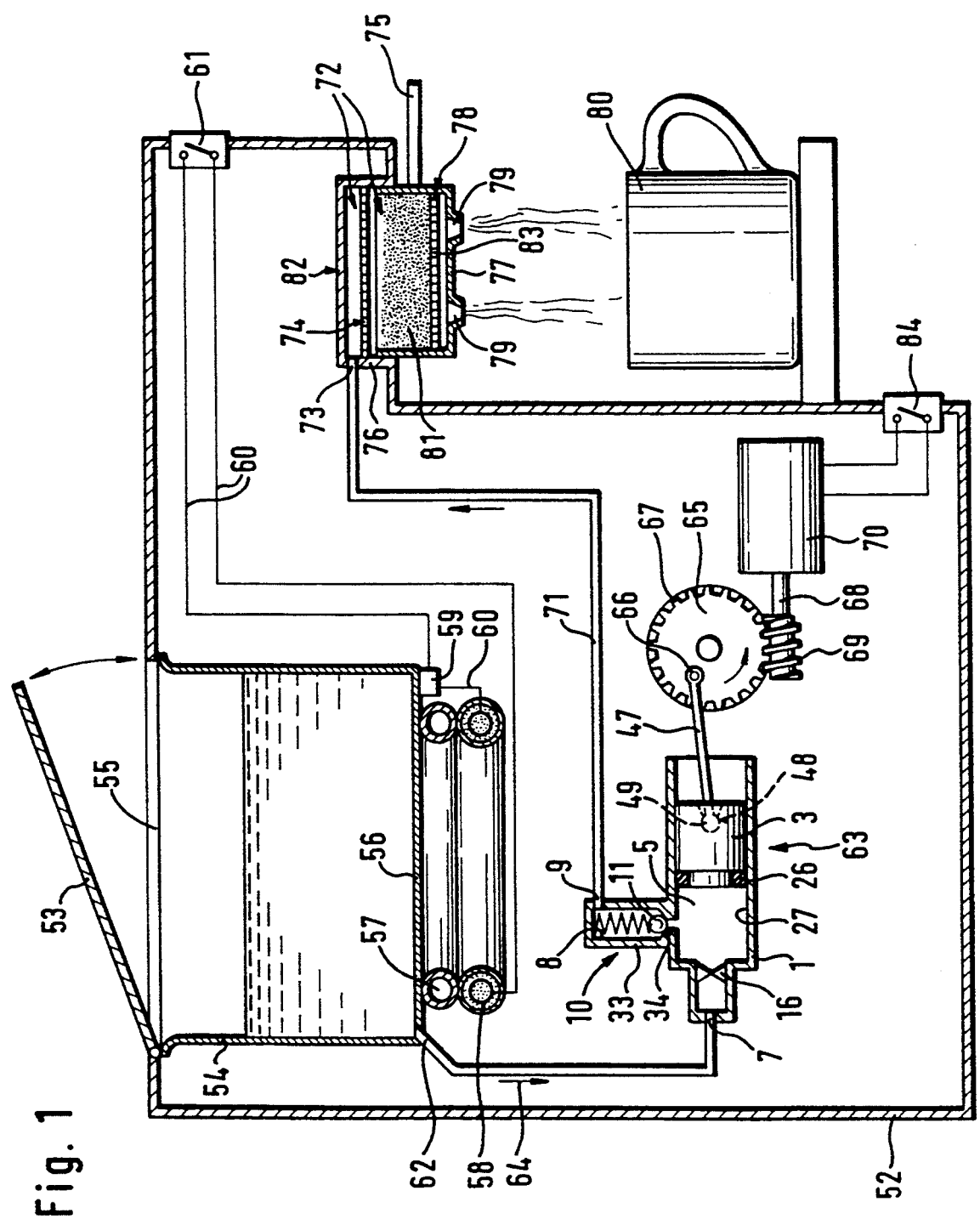

United States Patent [19]
Muller et al.

[11] Patent Number: 5,392,694
[45] Date of Patent: Feb. 28, 1995

[54] COFFEE MAKER

[75] Inventors: Roland Muller, Dreieich; Walter Hufnagl, Sulzbach, both of Germany

[73] Assignee: Braun Aktiengesellschaft, Kronberg, Germany

[21] Appl. No.: 135,283

[22] Filed: Oct. 12, 1993

[30] Foreign Application Priority Data

Oct. 15, 1992 [DE] Germany .......................... 4234746.7

[51] Int. Cl.⁶ .......................................... A47J 31/24
[52] U.S. Cl. .................................... 99/295; 99/302 P
[58] Field of Search ................... 99/295, 300, 302 R, 99/302 P, 307, 279, 299, 180, 281, 282, 283

[56] References Cited

U.S. PATENT DOCUMENTS

| | | | |
|---|---|---|---|
| 1,774,980 | 9/1929 | Lambert . | |
| 2,881,692 | 4/1959 | Volcov | 99/302 R |
| 3,039,488 | 6/1962 | Bowerman . | |
| 3,238,887 | 3/1966 | Volz . | |
| 3,373,695 | 3/1968 | Yohpe . | |
| 3,537,384 | 11/1970 | Stauber | 99/302 R |
| 3,641,918 | 2/1972 | Schellgell | 99/300 |
| 3,791,284 | 2/1974 | Donot | 99/302 R |
| 3,824,914 | 7/1974 | Casiano | 99/302 R |
| 4,757,753 | 7/1988 | Pandolfi | 99/302 R |
| 5,073,096 | 12/1991 | King et al. . | |
| 5,171,136 | 12/1992 | Pacht . | |

FOREIGN PATENT DOCUMENTS

| | | |
|---|---|---|
| 443665 | 8/1991 | European Pat. Off. . |
| 0531699 | 3/1993 | European Pat. Off. . |
| 2191621 | 1/1974 | France . |
| 966949 | 9/1957 | Germany . |
| 1453626 | 11/1964 | Germany . |
| 3504789 | 2/1985 | Germany . |
| 3833484 | 10/1988 | Germany . |
| 2126655 | 3/1984 | United Kingdom . |

OTHER PUBLICATIONS

Niemann, "Maschinenelemente," Band I Konstruktion und Berechnung von Verbindungen, Lagern, Wellen, Springer-Verlag Berlin-Heidelberg-New York, 1975.

Primary Examiner—Robert W. Jenkins
Attorney, Agent, or Firm—Fish & Richardson

[57] ABSTRACT

A coffee maker having a heating device for heating water to the temperature necessary for producing a coffee drink. The coffee maker is equipped with an electrically powered pump for the delivery of water, with a bore being provided in the pump casing. Within the bore, a working piston reciprocates, its stroke determining a working chamber. The coffee maker is provided with a suction valve and a discharge valve, each including a valve closure body spring-loaded in the closing direction. The suction valve is opened by pressure below atmospheric and the discharge valve by pressure above atmospheric in the working chamber. The preparation of the coffee drink is accomplished by the pump drawing water through the suction valve and delivering it under pressure through the discharge valve to a brewing chamber adapted to be filled with coffee grinds from which it escapes following extraction. The pump draws hot water which is already preheated by the heating device to the temperature suitable for preparing the brew, with the suction valve being configured as a poppet valve. As a result, brewing water heated to a practically constant temperature is supplied to the material, irrespective of the firmness to which the coffee grinds are compressed and the fineness of the grind, and also irrespective of the quantity of coffee or espresso to be made, with the hot water being pumped to the brewing chamber without an appreciable drop in pump capacity occurring.

18 Claims, 2 Drawing Sheets

COFFEE MAKER

This invention relates to a coffee maker with a heating device for heating water to the temperature necessary for producing a coffee drink, and with an electrically powered pump for the delivery of water, the pump casing having a bore therein in which a working piston reciprocates, its stroke determining a working chamber, and with a suction valve and a discharge valve comprising each a valve closure body spring-loaded in the closing direction, the suction valve being opened by pressure below atmospheric and the discharge valve by pressure above atmospheric in the working chamber, the preparation of the coffee drink being accomplished by the pump drawing water through the suction valve and delivering it under pressure through the discharge valve to a brewing chamber adapted to be filled with coffee grinds from which it escapes following extraction.

A coffee maker of this type serving in particular for making espresso has been commercially available since 1989, being marketed by Form+Funktion of D-6900 Heidelberg under the designation "Coffee-Profi". This coffee maker includes a temperature-controlled thermoblock in which a water conduit is provided which is heated by a heating device integrally cast in the thermoblock. Between the thermoblock and a water reservoir integrally formed in the housing is a piston pump driven by a magnetic field and referred to as a swinging-lever pump which draws in the water delivered by the water reservoir, pumping it subsequently under pressure through the water conduit formed in the thermoblock. In the water conduit of the thermoblock, the water is heated by the heating device and finally directed under pressure to a brewing unit adapted to hold the coffee grinds. After the coffee grinds are extracted, the brew is ready, flowing into a recipient adapted to be placed underneath the brewing unit.

In such a construction of a coffee maker, it is considered a disadvantage that the water temperature required for brewing coffee or espresso can hardly be maintained properly because the temperature control device controls the water temperature only indirectly by means of the temperature of the thermoblock. On the one hand, when only one cup of coffee is brewed, the consequence is that the temperature of the water flowing from the thermoblock to the brewing unit is usually too high. As a result, the coffee grinds get "burnt", that is bitter substances and oils dissolve in the water already at the beginning of the brewing cycle, ultimately adversely affecting the flavor of the brew.

On the other hand, when it is desired to brew several cups of coffee, the heating device is unable to heat the water flowing through, and heated in, the thermoblock so rapidly to the requisite temperature because a certain amount of time will invariably elapse until the thermoblock is again heated by the heating device sufficiently to enable it to supply a sufficient amount of heat to the water. In consequence, the heated water enters the brewing unit at an insufficient temperature, preventing the extraction of all the necessary flavors and aromatic substances from the coffee grinds. The result is an insufficiently hot beverage with a poor aroma.

Further, a coffee maker marketed by the applicant itself under the designation "Braun Espresso Master professional", type E 400 T, is known in which the water, rather than being heated by a thermoblock, is heated by a boiler provided with a heating device and closed against atmosphere, with a swinging-lever pump being connected upstream of the boiler. The swinging-lever pump draws cold water from a water reservoir, putting it under pressure and pumping it to the boiler where it is heated and subsequently directed to a brewing unit filled with coffee grinds. Whilst this coffee maker is capable of maintaining the temperature of the water comparatively accurately in cases where only one cup of coffee is required, the brewing of several cups in succession results likewise in the disadvantage that the cold water admitted to the boiler is heated too slowly or mixes too rapidly with the hot water already contained in the boiler, so that ultimately the water supplied to the brewing unit for brewing coffee is again too cold.

Further, an espresso maker is known from EP-A-0 531 699 in which the entire water provided for preparing the beverage is heated in an open boiler by a heating device, is drawn from the boiler by a piston pump and delivered under pressure to the brewing chamber filled with coffee grinds. Although in this espresso maker the brewing operation can be performed with brewing water of a defined temperature, experience has shown that in the use of piston pumps heated water can only be pumped at a temperature below the optimum temperature for brewing coffee, which is between 93° C. and 97° C. The reason for this is that the pump capacity breaks down when the temperature of the pumped water exceeds a specific value.

It is therefore an object of the present invention to provide a coffee maker in which water at a temperature optimum for making espresso can be pumped to the material without appreciable drop in pump capacity, irrespective of the firmness to which the material is compressed in the filter basket and the fineness of the grind.

According to the present invention, this object is accomplished in that in a manner known per se the pump draws only water that is already preheated by the heating device to the temperature suitable for preparing the brew, and that the suction valve is configured as a poppet valve. By virtue of the coffee maker of the present invention, the pump first draws hot water, delivering it directly to the brewing unit where it has exactly the temperature necessary for making a coffee drink, so that for one thing the coffee grinds are optimally extracted, and for another thing undesired accompanying substances which would impair the flavor are prevented from entering the coffee. However; the drawing in of hot water at precisely the temperature necessary for making a coffee drink is only accomplished by the suction valve configured as a poppet valve, because this valve opens already in the presence of a low pressure below atmospheric in the working chamber, delivering consistently like amounts of water at like piston speeds, while at the same time the formation of vapor bubbles in the working chamber is avoided, Considering that the pump draws hot water, it is possible, for example, to maintain a large quantity thereof in a boiler at precisely the brewing temperature, thus eliminating the need to heat up or reheat the water during the brewing operation which would ultimately produce undesired temperature fluctuations of the water. Yet the present invention is also suitable for use in espresso makers employing a thermoblock or a pressure boiler.

By configuring the suction valve as a poppet valve, it is possible to apply a very low spring force to the valve closure body of the suction valve, which requires the application of only very low pressure differentials to the valve closure body for actuating the suction valve. The valve geometry being thus independent of the size of the working piston, relatively large effective and inlet cross-sections can be selected on the valve body, reducing the opening and suction pressure still further. This results in a piston pump in which cavitation is eliminated and the running noise is low while delivering an accurate quantity of water on each stroke. In addition, the pump is self-priming, that is, the water is drawn in by the generation of a vacuum at the first valve closure body when the hot-water apparatus is disposed under the pump.

In a preferred embodiment of the present invention, the poppet valve has at its end remote from the working chamber a valve stem engaging in an axial guideway, the popper valve further including a valve closure body received in the working chamber. In this manner, flow losses are reduced because of the possibility to select a relatively large inlet cross-section, so that the material contained in the filter basket receives a full supply of the hot water delivered in the working chamber per stroke, without appreciable temperature losses occurring. On the other hand, a space-saving pump with a low weight while yet affording reliable operation is also obtained at higher pressures in the range of between 15 and 20 bar, approximately, such a pump allowing ready integration in the coffee maker. Owing to the long central guideway of the valve closure body outside the working chamber, the poppet valve is guided into sealing engagement with its seat and centrally located there with relative accuracy. By arrangement of the valve stem in the inlet bore, hot water circulates around it producing a constant lubrication which has the added effect of keeping the noise of the coffee maker, when in operation, at a low level.

According to a further aspect of the present invention affording particular ease of assembly and compact design, a support plate for a valve spring is secured to the valve stem, the support plate being provided with passageways. This enables the valve spring to be clamped in place between the axial guideway of the popper valve and the support plate in a space-saving fashion.

With respect to the reliability of operation of the coffee maker, it is particularly advantageous that the poppet valve is made of a hot-water resistant plastics material, preferably polyamide, and the valve closure body is coated with a hot-water resistant layer of an elastomeric material, for example, silicone or EPDM. Owing to the improved valve seal, reliable start of operation of the coffee maker is also ensured under dry-run conditions after a prolonged period of non-use or in a slow delivery or metering operation of the pump.

According to a still further aspect of the present invention, the valve closure body preferably has a cap made of an elastomeric material, preferably EPDM or NBR, which is fitted by clamping it on in an enveloping fashion, snap-fitting, adhesive bonding, or shrinking. The hard-soft technique results in a rupture-proof poppet valve providing good sealing engagement between its outer surface and the associated valve seat.

A particularly good coffee without vapor bubbles forming as hot water is delivered is produced in that the ratio of the inlet cross-section on the open poppet valve to the outlet cross-section on the open discharge valve is about 4 to 1, and that the working piston has a diameter of about 8 mm with a stroke length of about 5 mm.

This ensures reliable opening of the valves also under dry-run conditions when the pump is placed into service for its initial start, thus obviating the need for venting the system by means of other venting devices.

With regard to ease of assembly, reliability of operation and good pump performance, it is advantageous for the discharge valve to have a valve closure body that is formed by a ball. The ball may be formed of a hotwater resistant elastomer, preferably EPDM or silicone rubber. Parts made of thermoplastics and elastomers can be manufactured at particularly low cost and can be easily formed in suitable molds, their elastic flexibility providing a perfect seal without the need for additional mechanical operations, so that function and service life of the coffee maker are significantly improved.

In a further feature of the coffee maker of the present invention, it is suggested that the pump casing be made of a plastics material and the valve seats be formed by neckings extending concentrically on the casing. In the use of components injection-molded of plastics, such neckings on an essentially tubular casing can be manufactured with particular ease without the need for subsequent additional processes. Equally, plastics material is a poor heat conductor, so that the heated water cools down only insignificantly as it is pumped. Particularly advantageously, the casing is injectionmolded of hot-water resistant polyacetal, preferably POM, because a highly uniform wall thickness is maintainable when these materials are selected. Also, distortion remains very low following cooling of the casing after it is injection-molded from these materials, without the material experiencing any noticeable shrinkage. As a result, good valve seats with a high surface quality are obtained, eliminating the need for an additional machining operation.

A particularly compact pump unit permitting also prior assembly which can then be readily installed in the coffee maker is provided by movably connecting the working piston with a connecting rod driven by an electric motor through an eccentric and a gearing. This drive unit operates substantially more effectively with an accurate pump capacity which can also be reduced to a minimum by altering the rotational frequency, which is of particular advantage for the generation of steam in espresso makers.

The pumps used in the majority of domestic espresso makers are of the swinging-lever type, including a stepped working piston provided with a central passage bore. The working piston has its ends supported in a swinging fashion by two main springs and is incited to perform reciprocating movements by a magnetic field generated by a coil such a swinging-lever pump builds to relatively long dimensions because of the series arrangement of main springs and working piston and because of the coil winding, has rather a large diameter, and a comparatively high weight.

In such a swinging-lever pump, the reduced-diameter end of the working piston extends into the working chamber, with the associated end of the passage bore being acted upon by a spring-loaded valve closure body of the suction valve. In this arrangement, the valve spring associated with the suction valve is in the working chamber, bearing with its end opposite the working piston against the working chamber. The valve closure body of the suction valve invariably performs reciprocating movements in conjunction with the working piston, causing the associated valve spring to be compressed on each delivery stroke.

Because in such swinging-lever pumps reasons of operational safety do not allow the valve closure body of the suction valve to lift clear of the working piston for a time of some length during the suction stroke, executing instead only very short and continually repetitive opening and closing movements, it is necessary for the valve closure body to continue to be acted upon by an appreciable spring force also in the end position of a suction stroke. As a result, the intake of water requires at all times a specific appreciable pressure differential across the valve closure body. By virtue of the coil arrangement, this swinging-lever pump employed in coffee makers operates at a relatively high reactive power, so that the total power (about 60 watts) is quite high for the pump operation of a coffee maker. This, too, results in improvements in the pump capacity as compared with conventional swinging-lever pumps when the suction valve of the present invention is configured as a poppet valve.

Further advantageous features as well as the function of the present invention will become apparent from the subsequent description of an embodiment of a coffee maker, reference being had to the accompanying drawings. In the drawings, FIG. 1 is a schematic representation of the construction of a coffee maker according to the present invention; and FIG. 2 is a longitudinal sectional view of an eccentric-operated piston pump of FIG. 1.

Figure 2:
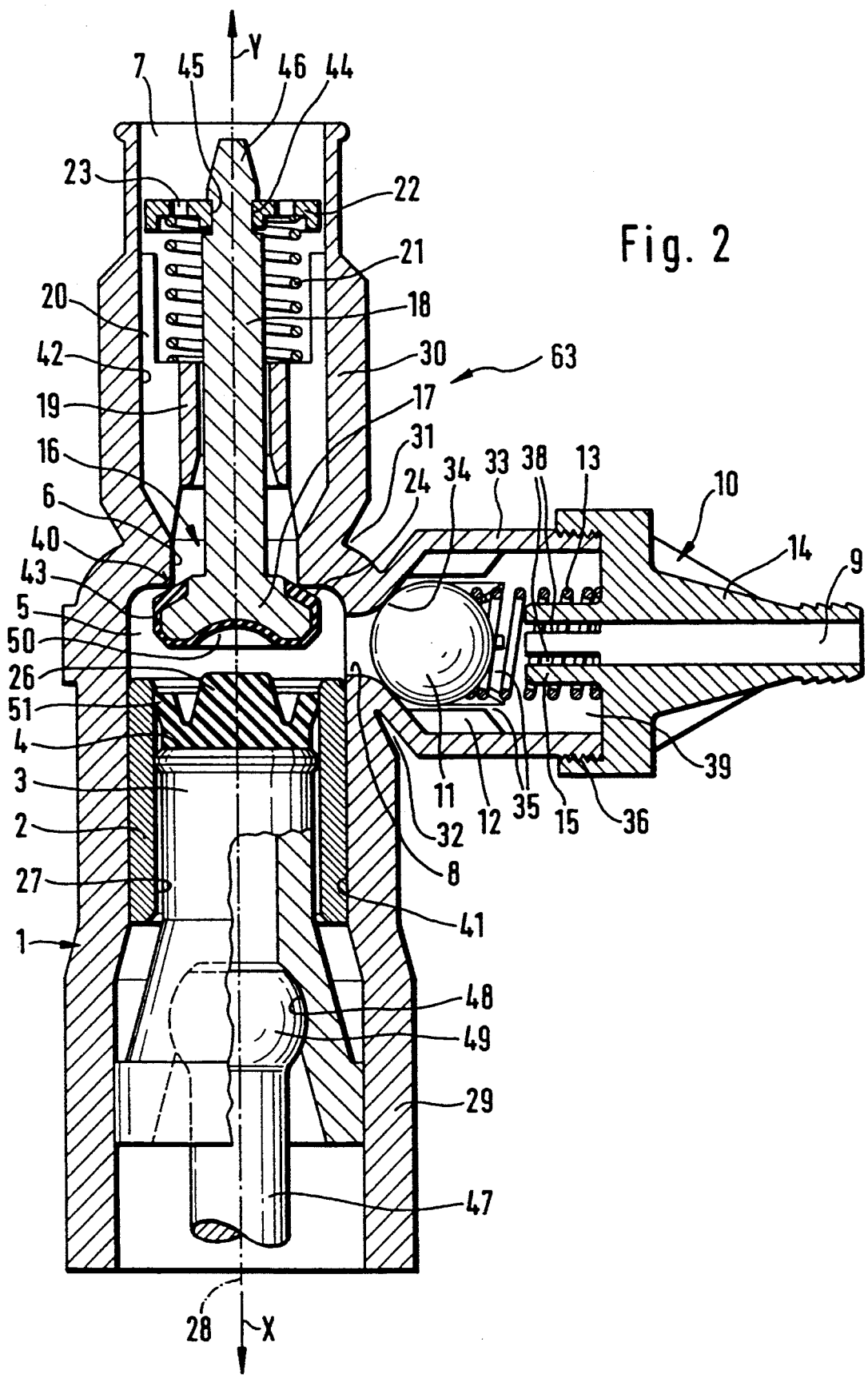

Referring now to FIG. 1 of the drawings, there is shown schematically the basic construction of a coffee maker of the invention which may preferably also find a useful application as an espresso maker. The housing 52 of the coffee maker has in its upper area a hinged lid 53 adapted to swing open in upward direction and, when open, permitting fresh water to be poured through the opening 55 into an unpressurized boiler 54. The boiler 54 is a hollow cylinder preferably made of stainless steel and provided with a bottom 56. Soldered or welded to the underside of the bottom 56 is a steam pipe 57 serving to generate steam, especially for making cappuccino. For this purpose, the steam pipe 57 is connected, by means of a steam conduit not illustrated in the drawings, to a steam nozzle (not shown) projecting outwardly from the housing 52.

Further referring to FIG. 1, an electric heating device 58 is attached to the underside of the steam pipe 57 by soldering, welding, or adhesive bonding. The connection between heating device 58, steam pipe 57 and bottom 56 is made such as to establish good heat conduction from the heating device 58 through the steam pipe 57 to the bottom 56 of the boiler 54.

Attached to the underside of the bottom 56 is a controllable thermostatic device 59 regulating the temperature of the water contained in the boiler 54 through the heating device 58. By electric lines 60, the thermostatic device 59 is connected in series with a switch 61 accessible from the outside which in the closed condition establishes the supply of current through the thermostatic device 59 to the heating device 58. By means of a line not shown in the drawings, the electric switch 61 is adapted to be connected to a supply of electricity.

According to FIG. 1, an outlet conduit 62 routed to the water inlet 7 of an electrically powered piston pump 63 is connected to the bottom 56 of the boiler 54. According to FIGS. 1 and 2, a suction valve 16 configured as a poppet valve is disposed in the casing 1 of the pump 63 at the water inlet 7, the valve opening during the suction stroke of the pump 63 to admit water into the working chamber 5 in the direction of flow 64. Opposite the suction valve 16, the working chamber 5 is bounded by a working piston 3 having attached to its end a packing 26 engaging the wall of the bore 27 (as clearly shown in FIG. 2) and providing a pressure-tight seal between the working piston 3 and the bore 27.

A rotary joint 48, 49 links the working piston 3 to a connecting rod 47 having its other end rotatably connected with an eccentric 66 secured to a gear 65. The teeth 67 provided on the outer periphery of the gear 65 engage with mating spur teeth 69 provided on a drive shaft 68. The drive shaft 68 is connected to the rotor, not shown in the drawings, of an electric motor 70 adapted to be turned on by a switch 84 for driving the pump 63.

Above top dead center of the working piston 3, a lateral casing section 33 having an outlet bore 8 is provided in which a discharge valve 10 closing in the direction of the working chamber 5 is received, the closure member thereof being formed by a spring-loaded valve closure ball 1t which in the closed position is in pressure-tight engagement with the second valve seat 34, as becomes clearly apparent from FIG. 2.

According to FIG. 1, the outlet bore 8 continues in a discharge pipe 71 connected to the upper space of a brewing chamber 72. Slightly below the inlet 73 of the discharge pipe 71 in the brewing chamber 72, an inlet filter 74 is inserted preventing the ingress of coffee grinds into the upper section of the brewing chamber 72. The actual brewing chamber 72 is preferably formed by a filter basket 76 to which a handle 75 is attached, the filter basket preferably locking onto the upper section of the brewing chamber 72 in sealing engagement therewith by a bayonet lock not shown in the drawings.

Fastened to the bottom 77 of the filter basket 76 is an outlet filter 78 that serves to retain the coffee grinds in the brewing chamber 72 when the brew, following extraction, flows out of the outlet ports 79 provided on the bottom 77 of the filter basket 76 into an underlying vessel 80. As becomes clearly apparent from FIG. 1, the section of the brewing chamber 72 formed intermediate the two filters 74, 78 serves as a bed for the coffee grinds 81.

In FIG. 2 the piston pump 63 illustrated on an enlarged scale is comprised of a casing 1 having in its lower casing section 29 a bore 41 in which a liner 2 for the working piston 3 is inserted by press-fit, the liner material being harder and more wear-resistant than the plastic casing 1. The pump is mounted in the housing (not shown) of an espresso maker equally not shown. The working piston 3 of the pump 63 is caused to reciprocate within the bore 27 of the liner 2 by a crank or eccentric drive (FIG. 1) whose connecting rod 47 then engages with an enlargement 49 formed at one end thereof with a recess 48 formed on the working piston 3 in the manner of a joint.

According to FIG. 2, the working piston 3 has mounted on its end 4 the packing 26 bounding the working chamber 5 in downward direction. Extending coaxially with, yet at least parallel to, the longitudinal axis 28 of the working piston 3 or the casing 1 is an inlet bore 6 connecting the working chamber 5 with the water inlet 7. The water inlet 7 is provided by a cylindrical upper casing section 30 formed integrally with the lower casing section 29, with a first necking 31 being provided in the transition area.

In FIG. 2, an outlet bore 8 branches from the working chamber 5 at right angles to the inlet bore 6. It connects the working chamber 5 with a water outlet 9, this connection being controlled by the spring-loaded discharge valve 10 provided in a casing section 33 extending laterally to the casing 1 and connected to the lower casing section 29 at a second necking 32 slightly below the first necking 31. The casing 1 is preferably molded of POM (polyoxymethylene).

In this arrangement, according to FIG. 2, the rim of the outlet bore 8 remote from the working chamber 5 provides a second valve seat 34 against which the valve closure ball 11 made of an elastomer bears resiliently. The valve closure ball 11 is guided in a cage 12 having several slots 35 extending radially to the outlet bore 8, and it is acted upon in the direction of the second valve seat 34 by a valve spring 13 bearing with its other end against the end portion 14 forming the water outlet 9.

The end portion 14 is sealingly connected to the lateral casing section 33 either by a snap-on or threaded connection 36 or by a frictional-engagement connection provided by welding or adhesive bonding. Extending axially in the direction of the valve closure ball 11, the end portion 14 has an extension 15 serving to guide the valve spring 13 and provided with several radial slots 38 to allow the passage of fluid within the chamber 39 formed between the ball 11 and the end portion 14. The type of construction of the discharge valve 10 lends itself to particular ease and economy of assembly.

The connection between the working chamber 5 and the water inlet 7 is controlled by the suction valve 16 constructed as a poppet valve. In this arrangement, the rim of the inlet bore 6 at the end close to the working chamber 5 is configured as a first valve seat 40 having in sealing engagement therewith the valve closure body 17 which is configured as a valve plate. The first valve seat 40 results from the necking 31 in the casing wall in the area of the bore 41 which is formed integrally in the manufacture of the integrally molded plastic casing 1. The sealing surface of the second valve seat 34 is suitably molded in the same operation.

Integrally formed on the valve plate 17 at the end remote from the working piston 3 is a valve stem 18 extending coaxially through the inlet bore 6 and carried in an axial guideway 19 configured as a sleeve formed on, or inserted in, the bore 42 of the upper casing section 30. The axial guideway 19 is linked to the bore 42 by several rib members 20 uniformly spaced on the circumference.

The valve closure body 17 is coated with an elastomer layer 43 applied by spraying or immersion techniques. Alternatively, the elastomer layer 43 may also be provided on a cap 43 snapped on, or clamped to, the surface of the valve closure body 17, thereby equally ensuring reliable sealing engagement of the valve closure body 17 with the first valve seat 40 and damped running of the pump. The axial guideway 19 ensures a perfect sealing engagement between the first valve seat 40 and the valve closure body 17, locating the poppet valve 16 centrally in its movement towards the valve seat. Also, the pressure differential across the valve closure body 17 necessary for opening the poppet valve 16 is reduced by the large-diameter valve seat 40, which would entail considerable space problems if a ball were selected.

A valve spring 21 bears with its one end against the end of the axial guideway 19 remote from the working piston 3, while its other end bears against a support plate 22. The support plate 22 is secured to the valve stem 18 by means of a snap fitting and is provided with several passageways 23 for improved fluid passage. The snap fitting is accomplished in that the inner wall 45 of the support plate. 22 engages within an annular groove 44 provided on the valve stem 18. This process involves slipping the support plate 22 over the pin 46 provided at the free end of the valve stem 18 and enlarging it elastically until the inner wall 45 snaps into the annular groove 44, whereby it is firmly seated upon the valve stem 18 in axial direction.

The valve closure body 17 is of a predominantly disk-shaped configuration when viewed in cross section. The sloping sealing surface 24 ensures at all times its centered seating engagement with the first valve seat 40, while at the same time enabling the poppet valve 16 to act with an increased pressure on the first valve seat 40. Facing the packing 26, the valve closure body 17 has a recess 50 which results in a reduced weight and accordingly, by virtue of the reduced mass of inertia, also in a faster response of the poppet valve 16, and which also improves the manufacture of the poppet valve 16 connected with the valve stem 18 because it avoids the accumulation of material in the injection-molding process.

The mode of operation of the pump of the present invention when utilized in an espresso maker is as follows:

Referring to FIG. 1, after a sufficient quantity of cold water is poured into the open boiler 54 following opening of the lid 53, the electrical power supply for the heating device 58 can be turned on by closing the switch 61. The thermostatic device 59 being also closed because the water is still cold, current will flow through the heating device 58, heating it. The heat transferred by the heating device 58 through the steam pipe 57 to the bottom 56 and the wall of the boiler 54 will quickly heat the water contained in the boiler 54 until it has attained the temperature necessary for brewing coffee or espresso, upon which the thermostatic device 59 will interrupt the supply of current to the heating device 58. A control knob not shown in the drawings may be used for adjusting the thermostat and thus for adjusting the desired water temperature, because coffee will require a temperature slightly lower than espresso. As soon as the filter basket 76 holding the coffee grinds 81 is inserted into the filter basket holder of the brewing unit 82 by sealing engagement therewith, the coffee grinds 81 are entrapped in the brewing chamber 72 thus formed between the filters 74, 78. When the switch 84 for operating the electric motor 70 is turned on, the electric motor 70 will drive, through the drive shaft 68, the pinion 69 which, by meshing with an associated gear 65, will cause rotation of an eccentric 66 which is in driving relationship with the connecting rod 47 having the working piston 3 connected to its other end.

In the movement of the working piston 3 in the direction of arrow X downwards from top dead center shown in FIG. 2, a pressure below atmospheric will develop in the working chamber 5 initially sealed against the outside by the valves 10, 16, and this pressure will increase until the force it exerts on the valve closure body 17 in the direction X becomes greater than the force acting in the direction Y which is produced by the biased valve spring 21 acting on the valve stem 18. The force acting in the direction X is generated by the pressure below atmospheric acting on the circular surface of the poppet valve 16. The circular surface is formed by projection in the direction X, the diameter of the circle being formed by the line of contact of the sealing surface 40.

Accordingly, as soon as the suction force acting on the poppet valve 16 in the direction X is greater than the force of the valve spring 21 acting in the direction Y, the valve closure body 17 will lift itself clear of the first valve seat 40, and hot water will be drawn from the boiler 54 through the outlet conduit 64 to the water inlet 7 and from there through the suction valve 16 into the working chamber 5. Owing to the comparatively low pressure below atmospheric necessary for opening the suction valve 16, the water which is very hot, but not boiling yet, is not heated to ebullition, whereby an undesired formation of vapor bubbles (cavitation) is avoided, improving the pump capacity. This is accomplished by the long-dimensioned and thus soft valve spring 21 for one thing and the large circular surface on the valve closure body 17 for another thing.

As soon as the working piston 3 of FIG. 2 has reached bottom dead center (not shown), traveling again upwards, the suction valve 16 will close, and the valve closure ball 11 of the discharge valve 10 will become unseated from the second valve seat 34, however, not until the biasing force of the valve spring 13 acting in the direction of the valve closure ball 11 is overcome by the pressure in the working chamber 5. Water being incompressible, a pressure above atmospheric will develop very quickly on the valve closure ball 11 already with a short stroke of the working piston 3 in the direction of the suction valve 16, causing the ball to unseat itself from the second valve seat 34 also when this seat is of a comparatively small diameter, opening the discharge valve 10.

According to FIGS. 1 and 2, the hot water is then directed through the water outlet 9 and a subsequent discharge pipe 71 to the inlet 73 where it is forced through the inlet filter 74 into the brewing chamber 72 containing the coffee grinds 81. The hot water is then forced under pressure through the coffee grinds, extracting the flavors and aromatic substances therein contained. Following extraction, the extract will escape through the filter holes 83 formed in the outlet filter 78, flowing through one or two outlet ports 79 into an underlying vessel 80 as, for example, an espresso cup.

After the working piston 3 has again reached top dead center shown in the drawings, the force of the valve spring 13 will again act on the valve closure ball 11 causing it to engage the second valve seat 34, and the working chamber 5 is again fully closed. A new working stroke will follow, proceeding again according to the mode of operation described in the foregoing.

The packing 26 has a circumferential sealing lip 51 which is in sealing engagement with the inner wall of the liner 2 such as to enable the pump 63 to pump water in a self-priming fashion when the boiler 54 with its outlet conduit 62 lies lower than the water inlet 7 of the pump 63. This is made possible in particular by the early opening of the suction valve 16, enabling a vacuum to be generated in the water inlet 7 that is sufficient for the self-priming of water.

The discharge valve 10 is designed such as to allow perfect venting of the working chamber 5, that is, the valve closure ball 11 will also open during the compression stroke of the working piston 3 when only air is compressed in the working chamber 5. Particularly where the supply lines 62, 7, 9, 63, 71, 73 from the boiler 54 to the brewing chamber 72 are of a minimum length and thermally insulated, temperature losses will hardly occur as the water is routed from the boiler 54 through the pump 63 to the brewing chamber 72, so that the temperature of the brewing water is at all times maintained at the value necessary for making coffee, irrespective of whether one or several cups are prepared and varying degrees of fineness and firmness of the grind.

We claim:

1. A coffee maker comprising a heating device for heating water to a temperature necessary for producing a coffee drink, a brewing chamber adapted to be filled with coffee grinds, and an electrically powered pump for the delivery of the heated water to the brewing chamber, said pump comprising a working piston and a pump casing having a bore therein in which said working piston reciprocates with a predetermined stroke, its stroke determining a working chamber in said bore, said pump further comprising a suction valve and a discharge valve each comprising a valve closure body spring-loaded in a closing direction, the suction valve being opened by pressure in the working chamber that is below atmospheric and the discharge valve being opened by pressure in the working chamber that is above atmospheric, wherein preparation of the coffee drink is accomplished by the pump drawing hot water that is preheated by the heating device through the suction valve and delivering it under pressure through the discharge valve to the brewing chamber from which it escapes following extraction, and wherein the suction valve is configured as a poppet valve.

2. The coffee maker as claimed in claim 1, wherein
the poppet valve has at its end remote from the working chamber a valve stem engaging in an axial guideway, and the valve closure body of the poppet valve is received in the working chamber.

3. The coffee maker as claimed in claim 2, further comprising
a valve spring and a support plate for the valve spring secured to the valve stem, and wherein the support plate is provided with passageways.

4. The coffee maker as claimed in claim 3, wherein
the valve spring is clamped in place between the axial guideway and the support plate.

5. The coffee maker as claimed in claim 2, wherein
the poppet valve is made of a hot-water resistant plastics material and the valve closure body is coated with a hot-water resistant layer of an elastomeric material.

6. The coffee maker as claimed in claim 5, wherein the hot-water resistant plastics material is a polyamide.

7. The coffee maker as claimed in claim 5, wherein the elastomeric material is silicone.

8. The coffee maker as claimed in claim 5, wherein the elastomeric material is EPDM.

9. The coffee maker as claimed in claim 1, wherein
the valve closure body has a cap fitted thereon which is made of an elastomeric material.

10. The coffee maker as claimed in claim 9, wherein the elastomeric material of the cap is EFDM.

11. The coffee maker as claimed in claim 9, wherein the elastomeric material of the cap is a nitrile butadiene rubber (NBR).

12. The coffee maker as claimed in claim 1, wherein
a ratio of the inlet cross-section on the open poppet valve to the outlet cross-section on the open discharge valve is about 4 to 1, and the working piston has a diameter of about 8 mm with a stroke length of about 5 mm.

13. The coffee maker as claimed in claim 1, is wherein the discharge valve has a valve closure body that is formed by a ball.

14. The coffee maker as claimed in claim 13, wherein the ball is made of a hot-water resistant elastomer.

15. The coffee maker as claimed in claim 1, wherein the casing is made of a plastics material and the valve seats are formed by neckings extending concentrically on the casing.

16. The coffee maker as claimed in claim 15, wherein the casing is injectionmolded of hot-water resistant polyacetal.

17. The coffee maker as claimed in claim 1, wherein the working piston is connected with a connecting rod driven by an electric motor through an eccentric and a gearing.

18. The coffee maker as claimed in claim 1, wherein the working piston is driven by magnetic induction.

* * * * *